(12) United States Patent
Yoshino et al.

(10) Patent No.: US 11,244,789 B2
(45) Date of Patent: Feb. 8, 2022

(54) ELECTRONIC COMPONENT

(71) Applicant: Murata Manufacturing Co., Ltd., Nagaokakyo (JP)

(72) Inventors: Kazuki Yoshino, Nagaokakyo (JP); Makoto Ogawa, Nagaokakyo (JP); Yasuhiro Nishisaka, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 29 days.

(21) Appl. No.: 16/924,411

(22) Filed: Jul. 9, 2020

(65) Prior Publication Data

US 2021/0020370 A1    Jan. 21, 2021

(30) Foreign Application Priority Data

Jul. 17, 2019 (JP) .............................. JP2019-131873

(51) Int. Cl.
    *H01G 4/232* (2006.01)
    *H01G 4/30* (2006.01)
    *H01G 4/008* (2006.01)

(52) U.S. Cl.
    CPC ........... *H01G 4/2325* (2013.01); *H01G 4/008* (2013.01); *H01G 4/30* (2013.01)

(58) Field of Classification Search
    CPC ......... H01G 4/2325; H01G 4/008; H01G 4/30
    See application file for complete search history.

(56) References Cited

U.S. PATENT DOCUMENTS

| | | | |
|---|---|---|---|
| 8,179,660 B2 * | 5/2012 | Katsube | H01G 4/30 361/306.1 |
| 10,902,994 B2 * | 1/2021 | Kim | H01F 27/2804 |
| 2009/0290280 A1 * | 11/2009 | Takeuchi | H01G 4/005 361/303 |
| 2017/0069428 A1 * | 3/2017 | Shimizu | H01G 4/232 |
| 2017/0345572 A1 | 11/2017 | Sasaki et al. | |
| 2018/0090274 A1 * | 3/2018 | Ito | H01G 4/30 |

FOREIGN PATENT DOCUMENTS

| | | | |
|---|---|---|---|
| CN | 107452505 A | 12/2017 | |
| JP | 2000-357627 A | 12/2000 | |
| JP | WO2007/007677 | * 1/2007 | ............... H01G 4/30 |
| JP | 4211783 B2 | 1/2009 | |
| JP | 2009-283598 | * 12/2009 | ............... H01G 4/12 |
| JP | 2015-198061 A | 11/2015 | |
| JP | 2017-011142 A | 1/2017 | |
| JP | 2018-006501 | * 1/2018 | ............... H01G 4/30 |
| KR | 10-2018-0112732 A | 10/2018 | |

OTHER PUBLICATIONS

Official Communication issued in corresponding Chinese Patent Application No. 202010677732.X, dated Aug. 27, 2021.
Official Communication issued in corresponding Korean Patent Application No. 10-2020-0078588, dated Jul. 7, 2021.

* cited by examiner

*Primary Examiner* — Dion R. Ferguson
(74) *Attorney, Agent, or Firm* — Keating & Bennett, LLP

(57) ABSTRACT

An electronic component includes a body portion and an external electrode. The external electrode is provided on a surface of the body portion. The external electrode includes a base electrode layer, a first Ni plated layer, and an upper plated layer. The first Ni plated layer is provided on the base electrode layer. The upper plated layer is provided above the first Ni plated layer. The first Ni plated layer includes Ni particles having an average particle size of not more than about 52 nm.

20 Claims, 5 Drawing Sheets

DEPTH FROM SURFACE OF EXTERNAL
ELECTRODE IN COMPARATIVE EXAMPLES

ELECTRONIC COMPONENT

CROSS REFERENCE TO RELATED APPLICATIONS

This application claims the benefit of priority to Japanese Patent Application No. 2019-131873 filed on Jul. 17, 2019. The entire contents of this application are hereby incorporated herein by reference.

BACKGROUND OF THE INVENTION

1. Field of the Invention

The present invention relates to an electronic component.

2. Description of the Related Art

Prior art documents disclosing the configuration of an electronic component include Japanese Patent Laid-Open No. 2017-11142. An electronic component described in Japanese Patent Laid-Open No. 2017-11142 is a ceramic electronic component in which a base electrode layer is formed at each of opposing end portions of a ceramic body having internal electrodes provided therein, and a plated layer is formed on the base electrode layer to form a terminal electrode. A Ni plated layer is formed on a surface of the base electrode layer, and a Sn plated layer is formed on the Ni plated layer.

In a conventional electronic component, hydrogen atoms are generated when a Ni plated layer is formed on a base electrode layer. The hydrogen atoms diffuse in the base electrode layer, and then also enter a body portion. This causes degradation of electrical characteristics of the electronic component.

SUMMARY OF THE INVENTION

Preferred embodiments of the present invention provide electronic components in each of which degradation of electrical characteristics is able to be reduced or prevented by reduction or prevention of diffusion of hydrogen atoms into a body portion.

An electronic component according to a preferred embodiment of the present invention includes a body portion and an external electrode. The external electrode is provided on a surface of the body portion. The external electrode includes a base electrode layer, a first Ni (nickel) plated layer, and an upper plated layer. The first Ni plated layer is provided on the base electrode layer. The upper plated layer is provided above the first Ni plated layer. The first Ni plated layer includes Ni particles having an average particle size of not more than about 52 nm.

The above and other elements, features, steps, characteristics, and advantages of the present invention will become more apparent from the following detailed description of the preferred embodiments with reference to the attached drawings.

DETAILED DESCRIPTION OF THE PREFERRED EMBODIMENTS

Figure 1:
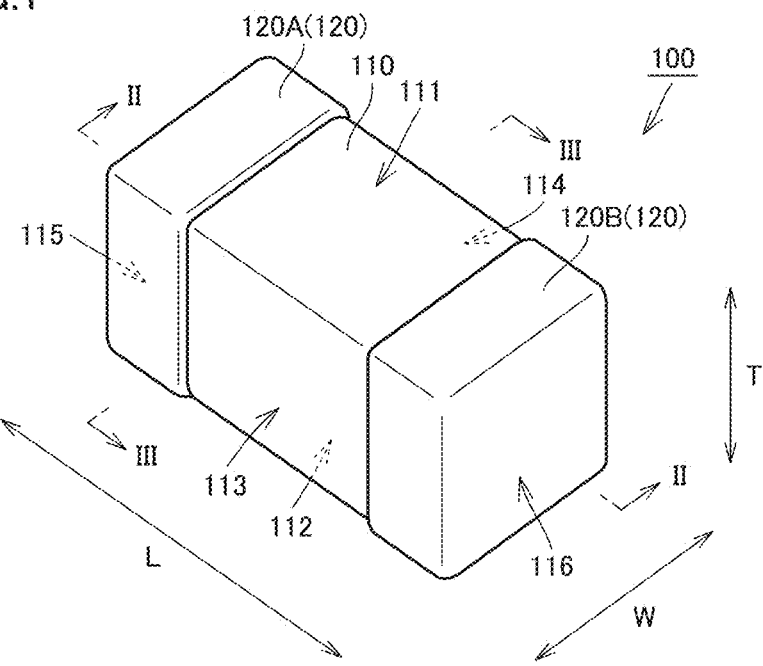
FIG. 1 is a perspective view illustrating an external appearance of an electronic component according to a first preferred embodiment of the present invention.

Electronic components according to preferred embodiments of the present invention will be described hereinafter with reference to the drawings. In the following description of each preferred embodiment, the same or corresponding portions in the drawings are denoted by the same reference characters and description thereof will not be repeated.

First Preferred Embodiment

Figure 2:
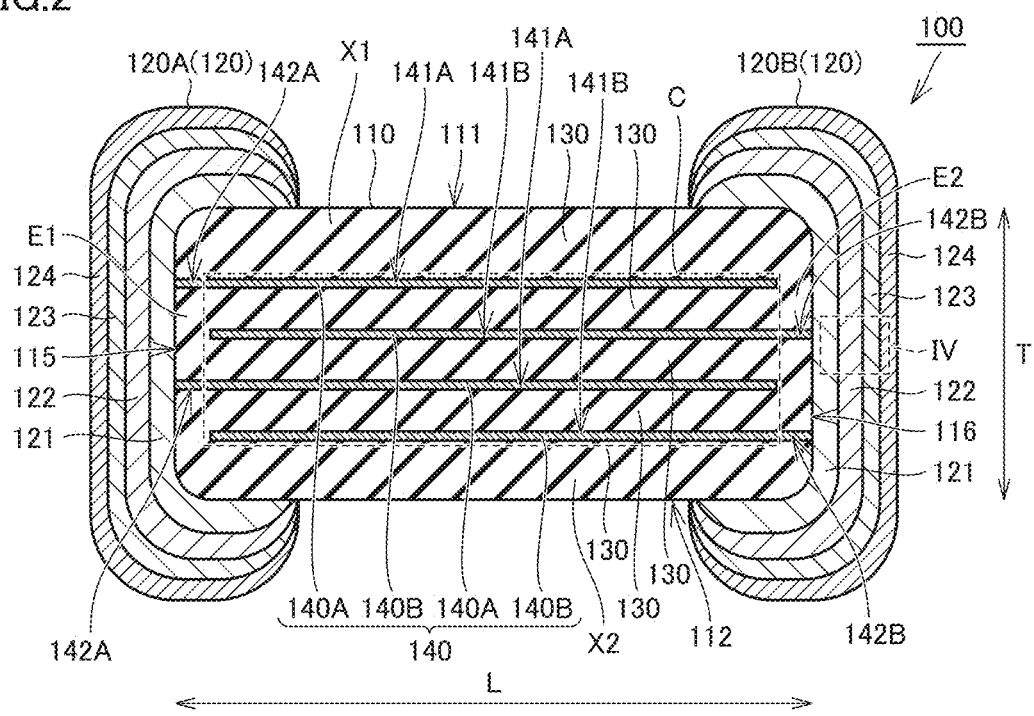
FIG. 2 is a cross-sectional view of the electronic component in FIG. 1 as seen from a direction of arrows of line II-II.
Figure 3:
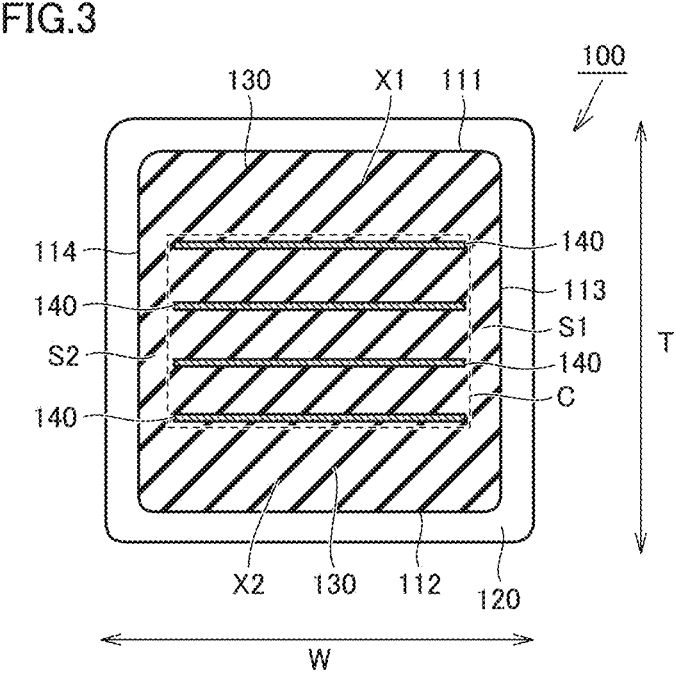
FIG. 3 is a cross-sectional view of the electronic component in FIG. 1 as seen from a direction of arrows of line III-III.
Figure 4:
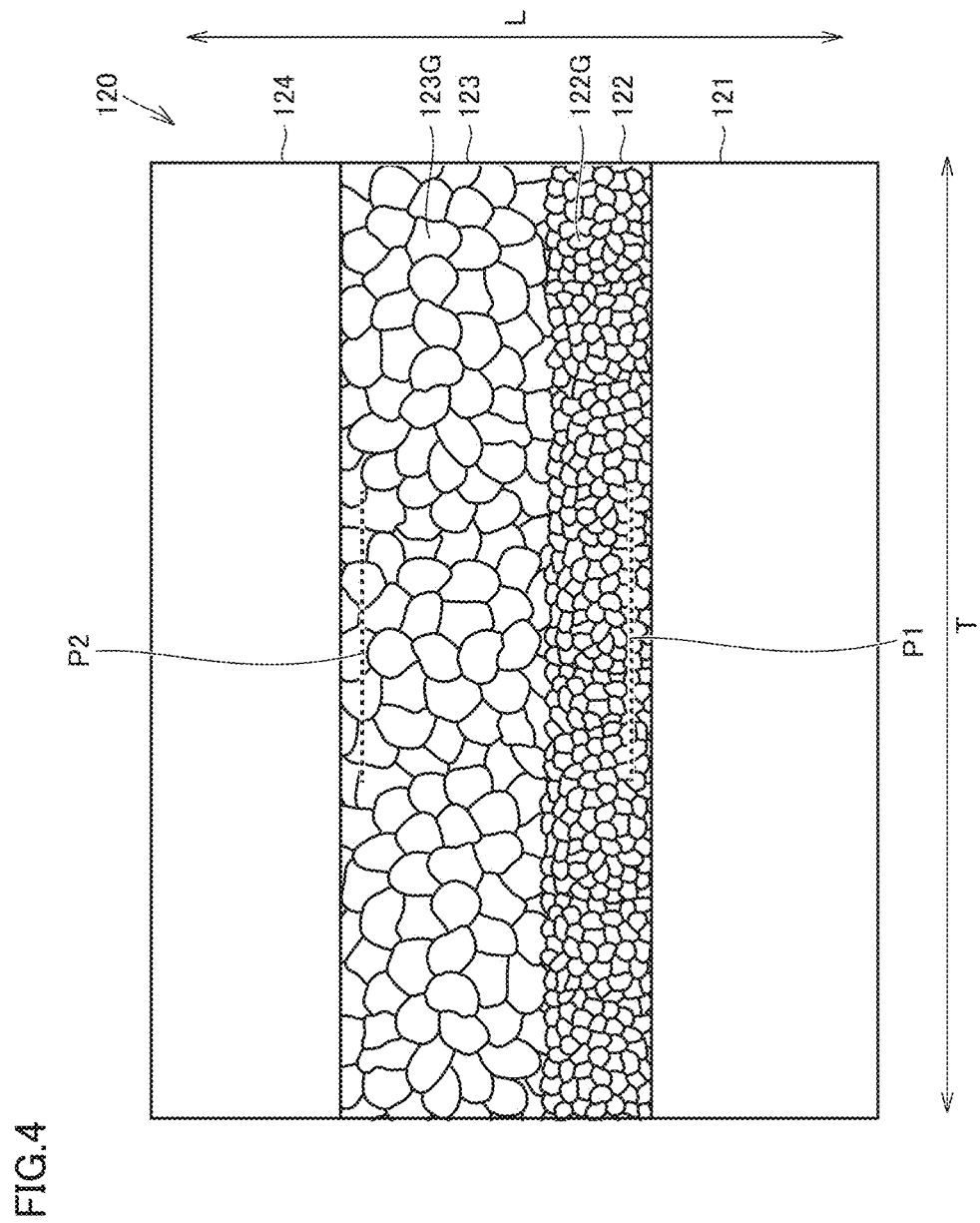
FIG. 4 is a schematic cross-sectional view illustrating Ni particles in a Ni plated layer in a portion IV of the electronic component in FIG. 2.

FIG. 1 is a perspective view illustrating an external appearance of an electronic component according to a first preferred embodiment of the present invention. FIG. 2 is a cross-sectional view of the electronic component in FIG. 1 as seen from a direction of arrows of line II-II. FIG. 3 is a cross-sectional view of the electronic component in FIG. 1 as seen from a direction of arrows of line FIG. 4 is a schematic cross-sectional view illustrating Ni particles in a Ni plated layer in a portion IV of the electronic component in FIG. 2.

An electronic component 100 according to the first preferred embodiment of the present invention is a multilayer ceramic capacitor, for example, as shown in FIG. 1, but may alternatively be, for example, a multilayer negative temperature coefficient (NTC) thermistor, or a multilayer inductor or ceramic battery (all-solid-state battery).

As shown in FIGS. 1 to 3, electronic component 100 according to the first preferred embodiment of the present invention includes a body portion 110 and an external electrode 120. In the present preferred embodiment, body portion 110 is a stacked body, and includes a plurality of dielectric layers 130 and a plurality of internal electrode layers 140 that are alternately stacked on one another along a stacking direction T.

Body portion 110 includes a first main surface 111 and a second main surface 112 opposed to each other in stacking direction T, a first side surface 113 and a second side surface 114 opposed to each other in a width direction W orthogonal or substantially orthogonal to stacking direction T, and a first end surface 115 and a second end surface 116 opposed to each other in a length direction L orthogonal or substantially orthogonal to both stacking direction T and width direction W.

As shown in FIGS. 1 and 2, external electrode 120 is provided on a surface of body portion 110. In electronic component 100 according to the present preferred embodiment, external electrode 120 includes a first external electrode 120A and a second external electrode 120B. First external electrode 120A is provided on first end surface 115. Second external electrode 120B is provided on second end surface 116.

The plurality of internal electrode layers 140 include a plurality of first internal electrode layers 140A connected to first external electrode 120A, and a plurality of second internal electrode layers 140B connected to second external electrode 120B. As shown in FIG. 2, first internal electrode layer 140A includes a facing portion 141A facing second internal electrode layer 140B, and an extracted portion 142A extending to first end surface 115. Second internal electrode layer 140B includes a facing portion 141B facing first internal electrode layer 140A, and an extracted portion 142B extending to second end surface 116.

As shown in FIGS. 1 to 3, body portion 110 which is a stacked body is divided into an inner layer portion C, a first outer layer portion X1 and a second outer layer portion X2, a first side margin portion S1 and a second side margin portion S2, and a first end margin portion E1 and a second end margin portion E2.

In inner layer portion C, facing portions 141A of first internal electrode layers 140A and facing portions 141B of second internal electrode layers 140B are stacked in stacking direction T to have a capacitance. First outer layer portion X1 is located on a first main surface 111 side of inner layer portion C in stacking direction T. Second outer layer portion X2 is located on a second main surface 112 side of inner layer portion C in stacking direction T.

First side margin portion S1 is located on a first side surface 113 side of inner layer portion C in width direction W. Second side margin portion S2 is located on a second side surface 114 side of inner layer portion C in width direction W. First end margin portion E1 is located on a first end surface 115 side of inner layer portion C in length direction L. Second end margin portion E2 is located on a second end surface 116 side of inner layer portion C in length direction L.

It is preferable that each of a dimension of first side margin portion S1 in width direction W, a dimension of second side margin portion S2 in width direction W, a dimension of first end margin portion E1 in length direction L, and a dimension of second end margin portion E2 in length direction L are relatively small, from the viewpoint of reducing the size of electronic component 100, without decrease in insulation resistance of electronic component 100. In the present preferred embodiment, the decrease in insulation resistance of electronic component 100 can be reduced or prevented, as will be described later, thus allowing each of the above-described dimensions to be relatively small. For example, each of the dimension of first end margin portion E1 in length direction L and the dimension of second end margin portion E2 in length direction L is preferably not less than about 10 μm and not more than about 30 μm.

Each of the plurality of dielectric layers 130 included in inner layer portion C preferably has a thickness not less than about 0.4 μm and not more than about 0.6 μm, and more preferably not less than about 0.4 μm and not more than about 0.45 μm, for example.

In the present preferred embodiment, electronic component 100 preferably has a dimension of not more than about 2.0 mm in length direction L, a dimension of not more than about 1.25 mm in width direction W, and a dimension of not more than about 1.25 mm in stacking direction T, for example. The external dimension of electronic component 100 can be measured by observing electronic component 100 with an optical microscope.

Dielectric layer 130 is preferably made of a perovskite compound including Ba or Ti, for example. As a material of dielectric layer 130, for example, dielectric ceramics mainly made of $BaTiO_3$, $CaTiO_3$, $SrTiO_3$, $CaZrO_3$ or the like can be used. A material in which a Mn compound, a Mg compound, a Si compound, an Fe compound, a Cr compound, a Co compound, a Ni compound, an Al compound, a V compound, a rare-earth compound or the like is added as a sub-component to the above-described main component may also be used. The material forming dielectric layer 130 preferably has a dielectric constant of not less than about 1000, for example.

Each of the plurality of internal electrode layers 140 preferably has a thickness not less than about 0.3 μm and not more than about 1.0 μm, for example. A coverage rate indicating that each of the plurality of internal electrode layers 140 covers dielectric layer 130 without any gap is preferably not less than about 50% and not more than about 95%, for example.

As a material for internal electrode layer 140, one type of metal selected from the group consisting of Ni, Cu, Ag, Pd, and Au, or an alloy including this metal, such as, for example, an alloy of Ag and Pd, can preferably be used. Internal electrode layer 140 may include dielectric particles having the same or substantially the same composition as that of the dielectric ceramics included in dielectric layer 130.

As shown in FIG. 2, in the present preferred embodiment, external electrode 120 includes a base electrode layer 121, a first Ni (nickel) plated layer 122, a second Ni plated layer 123, and an upper plated layer 124.

In the present preferred embodiment, base electrode layer 121 is a baked layer obtained by applying a conductive paste to body portion 110 which is a stacked body and baking the same. Base electrode layer 121 includes metal and glass. The metal included in base electrode layer 121 preferably includes, for example, Cu (copper), Ag (silver), Au (gold), Ni (nickel), Sn (tin), or an alloy having any of them. In the present preferred embodiment, the metal is more preferably Cu, for example. The glass preferably includes Si, for example.

Base electrode layer 121 may further include a metal oxide such as $BaTiO_3$, for example. Base electrode layer 121 may further include a resin component. Examples of the resin component include an epoxy resin, a phenol resin, an urethane resin, a silicone resin, and a polyimide resin. The resin component is preferably an epoxy resin or a phenol resin, for example. When base electrode layer 121 includes metal and a resin component, base electrode layer 121 is preferably, for example, a resin electrode layer having a metal filler.

Base electrode layer 121 may include a plurality of stacked layers. Base electrode layer 121 may be a layer fired simultaneously with internal electrode layer 140.

First Ni plated layer 122 is provided on base electrode layer 121. First Ni plated layer 122 is substantially made of only metal Ni. In the process of forming first Ni plated layer 122, NiO (nickel oxide) may be included as an unavoidable impurity in first Ni plated layer 122. As shown in FIG. 4, first Ni plated layer 122 preferably includes Ni particles 122G having an average particle size of not more than about 52 nm, for example.

As shown in FIG. 2, second Ni plated layer 123 is located between first Ni plated layer 122 and upper plated layer 124. Second Ni plated layer 123 is substantially made of only metal Ni. In the process of forming second Ni plated layer 123, NiO (nickel oxide) may be included as an unavoidable impurity in second Ni plated layer 123. As shown in FIG. 4, second Ni plated layer 123 preferably includes Ni particles 123G having an average particle size of not less than about 99 nm, for example. In the present preferred embodiment, the average particle size of Ni particles 123G of second Ni plated layer 123 is preferably, for example, not less than about 2.3 times the average particle size of Ni particles 122G of first Ni plated layer 122.

In the present preferred embodiment, the first Ni plated layer and the second Ni plated layer preferably have a total average thickness preferably not less than about 0.5 μm and not more than about 10 μm, more preferably not more than about 4.5 μm, and still more preferably not more than about 3.7 μm, for example. In addition, first Ni plated layer 122 preferably has a thickness greater than the thickness of second Ni plated layer 123 due to the fact that first Ni plated layer 122 occludes more hydrogen atoms, as will be described later. The relatively large thickness of first Ni plated layer 122 allows first Ni plated layer 122 to trap more hydrogen atoms. This, in turn, can reduce or prevent the decrease in insulation resistance, and reduce an average thickness of the entire external electrode 120 to reduce the size of electronic component 100. In the present preferred embodiment, first Ni plated layer 122 preferably has a thickness that is not less than about 0.03 times and not more than about 14.5 times the thickness of second Ni plated layer 123, for example.

Second Ni plated layer 123 may not be included in external electrode 120. A preferred embodiment of the present invention in which external electrode 120 does not include second Ni plated layer 123 will be described later.

Upper plated layer 124 is provided above first Ni plated layer 122. Specifically, upper plated layer 124 is provided on second Ni plated layer 123. In the present preferred embodiment, upper plated layer 124 is preferably a Sn plated layer, for example. The Sn plated layer is substantially made of only Sn. In the present preferred embodiment, upper plated layer 124 preferably has a thickness not less than about 0.5 μm and not more than about 10 μm, and more preferably not more than about 4.5 μm, for example.

Now, a non-limiting example of a method of measuring each of Ni particles 122G of first Ni plated layer 122 and Ni particles 123G of second Ni plated layer 123 in the first preferred embodiment of the present invention will be described.

As shown in FIGS. 1, 2 and 4, first, electronic component 100 is polished to expose a cross section orthogonal or substantially orthogonal to width direction W, and the cross section is observed. A focused ion beam (FIB) device, for example, is used to polish electronic component 100. When observing the cross section, an average particle size of each of Ni particles 122G of first Ni plated layer 122 and Ni particles 123G of second Ni plated layer 123 is measured with a microscope.

As shown in FIGS. 2 and 4, a measurement position P1 of Ni particles 122G in first Ni plated layer 122 is a central portion in stacking direction T, at a distance of about 100 nm from base electrode layer 121 in length direction L.

Figure 5:
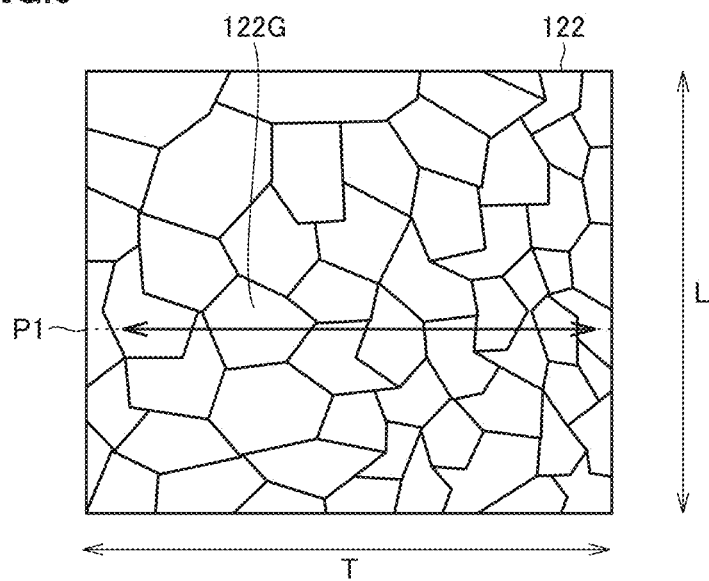
FIG. 5 is a schematic partial cross-sectional view illustrating a method of measuring an average particle size of the Ni particles in the electronic component according the first preferred embodiment of the present invention.

FIG. 5 is a schematic partial cross-sectional view illustrating the method of measuring the average particle size of the Ni particles in the electronic component according to the first preferred embodiment of the present invention. As shown in FIG. 5, on measurement position P1, a total length of ten Ni particles 122G adjacent to one another in first Ni plated layer 122 is measured. The total length is divided by 10, to measure the average particle size of Ni particles 122G in first Ni plated layer 122.

As shown in FIGS. 2 and 4, a measurement position P2 of Ni particles 123G in second Ni plated layer 123 is a central portion in stacking direction T, at a distance of 100 nm from upper plated layer 124 in length direction L. On measurement position P2, a total length of ten Ni particles 123G adjacent to one another in second Ni plated layer 123 is measured. The total length is divided by 10, to measure the average particle size of Ni particles 123G in second Ni plated layer 123.

A method of measuring the dimensions of the components will now be described. The thickness of each of dielectric layers 130 and internal electrode layers 140 included in inner layer portion C is measured as follows. First, electronic component 100 is polished to expose a cross section orthogonal or substantially orthogonal to length direction L. The exposed cross section is observed with a scanning electron microscope. Next, measurement is performed of the thickness of each of dielectric layers 130 and internal electrode layers 140 on five lines in total, i.e., a center line along stacking direction T passing through the center or the approximate center of the exposed cross section as well as two lines drawn from this center line toward one side at regular intervals and two lines drawn from this center line toward the other side at regular intervals. An average value of the five measurement values of dielectric layers 130 is defined as the thickness of dielectric layer 130. An average value of the five measurement values of internal electrode layers 140 is defined as the thickness of internal electrode layer 140.

In each of an upper portion, a central portion, and a lower portion located on a boundary line that divides the exposed cross section into four portions in stacking direction T, measurement may be performed of the thickness of each of dielectric layers 130 and internal electrode layers 140 on the above-described five lines, and an average value of the measurement values of dielectric layers 130 may be defined as the thickness of dielectric layer 130 and an average value of the measurement values of internal electrode layers 140 may be defined as the thickness of internal electrode layer 140.

Each of a dimension of body portion 110 which is a stacked body in width direction W and a dimension of body portion 110 in stacking direction T is measured by observing, with an optical microscope, a portion of body portion 110 not covered with first external electrode 120A and second external electrode 120B. A measurement position is a central portion in length direction L.

A dimension of body portion 110 which is a stacked body in length direction L is measured as follows. First, electronic component 100 is polished to expose a cross section orthogonal or substantially orthogonal to width direction W. The exposed cross section is observed with a microscope and the dimension is measured. A measurement position is a central portion in stacking direction T.

Each of a dimension of first outer layer portion X1 in stacking direction T and a dimension of second outer layer portion X2 in stacking direction T is measured as follows. First, electronic component 100 is polished to expose a cross section orthogonal or substantially orthogonal to width direction W. The exposed cross section is observed with a microscope and each of the above-described dimensions is measured. A measurement position is the central portion in length direction L.

Each of a dimension of first end margin portion E1 in length direction L and a dimension of second end margin portion E2 in length direction L is measured as follows. First, electronic component 100 is polished to expose a cross section orthogonal or substantially orthogonal to width direction W. The exposed cross section is observed with a microscope and each of the above-described dimensions is measured. Measurement positions are an upper portion, a central portion and a lower portion located on a boundary line that divides the exposed cross section into four parts in stacking direction T. An average value of the measurement values of first end margin portion E1 at these three locations is defined as the dimension of first end margin portion E1 in length direction L, and an average value of the measurement values of second end margin portion E2 at these three locations is defined as the dimension of second end margin portion E2 in length direction L.

The thickness of each of first side margin portion S1 and second side margin portion S2 is measured as follows. First, electronic component 100 is polished to expose a cross section orthogonal or substantially orthogonal to length direction L. The exposed cross section is observed with a microscope and measured. Measurement positions are an upper portion, a central portion and a lower portion located on a boundary line that divides the exposed cross section into four parts in stacking direction T. An average value of the measurement values of first side margin portion S1 at these three locations is defined as the dimension of first side margin portion S1 in width direction W, and an average value of the measurement values of second side margin portion S2 at these three locations is defined as the dimension of second side margin portion S2 in width direction W.

The thickness of base electrode layer 121 is measured as follows. First, electronic component 100 is polished to expose a cross section orthogonal or substantially orthogonal to width direction W. The exposed cross section is observed with a microscope and measured. A measurement position is the central portion in stacking direction T.

The thickness of each of first Ni plated layer 122, second Ni plated layer 123 and upper plated layer 124 is measured as follows. First, electronic component 100 is polished with the FIB device to expose a cross section orthogonal or substantially orthogonal to width direction W. The exposed cross section is observed with a microscope, and each of the above-described thicknesses is measured. A measurement position is the central portion in stacking direction T. The thickness of upper plated layer 124 may be measured with a fluorescent X-ray film thickness meter.

A non-limiting example of a method of manufacturing electronic component 100 according to the first preferred embodiment of the present invention will be described below. The method of manufacturing electronic component 100 described below is a method of manufacturing a multilayer ceramic capacitor, for mass-producing a plurality of multilayer ceramic capacitors simultaneously by collectively performing the processing treatment halfway through the manufacturing process to fabricate a mother stacked body, and thereafter, cutting and dividing the mother stacked body into individual pieces, and further performing the processing treatment on a divided soft stacked body.

When electronic component 100 which is a multilayer ceramic capacitor is manufactured, ceramic slurry is first prepared. Specifically, a ceramic powder, a binder, a solvent and the like are mixed at a prescribed blending ratio, to thus form the ceramic slurry.

Next, a ceramic green sheet is formed. Specifically, the ceramic slurry is shaped into a sheet on a carrier film using a die coater, a gravure coater, a microgravure coater or the like, for example, to thus form the ceramic green sheet.

Next, a mother sheet is formed. Specifically, a conductive paste is printed on the ceramic green sheet using a screen printing method, a gravure printing method or the like, for example, so as to have a prescribed pattern, to thus form the mother sheet having the prescribed conductive pattern on the ceramic green sheet.

In addition to the mother sheet having the conductive pattern, a ceramic green sheet not having a conductive pattern is also prepared as the mother sheet.

Next, the mother sheets are stacked. Specifically, the prescribed number of mother sheets forming first outer layer portion X1 and not having the conductive pattern are stacked, and a plurality of mother sheets forming inner layer portion C and having the conductive pattern are sequentially stacked on the prescribed number of mother sheets, and the prescribed number of mother sheets forming second outer layer portion X2 and not having the conductive pattern are stacked on the plurality of mother sheets. A group of mother sheets are thereby formed.

Next, the group of mother sheets are compression-bonded. The group of mother sheets are pressurized and compression-bonded along stacking direction T using isostatic pressing or rigid body pressing, for example, to thus form a mother stacked body.

Next, the mother stacked body is cut. Specifically, the mother stacked body is cut in a matrix manner using press-cutting or dicing, for example, and divided into a plurality of soft stacked bodies.

Next, the soft stacked bodies are barrel-polished. Specifically, the soft stacked bodies are put into a small box called a "barrel," together with a media ball having a hardness higher than that of the ceramic material, and the barrel is rotated, to thus round corner portions and ridge portions of the soft stacked bodies to have a curved surface.

Next, the soft stacked bodies are fired. Specifically, the soft stacked bodies are heated to a prescribed temperature, to thus fire the dielectric ceramics material. The firing temperature is set as appropriate depending on the type of the dielectric ceramics material, and is preferably set to be within the range of not less than about 900° C. and not more than about 1300° C., for example.

Next, a base electrode layer is formed on a surface of body portion 110 which is a stacked body. Specifically, base electrode layer 121 of each of first external electrode 120A and second external electrode 120B is formed, for example, using various types of thin film formation methods, various types of printing methods, a dipping method or the like. For example, when the base electrode layer is formed using the dipping method, a conductive paste is applied to first end surface 115 and second end surface 116 of body portion 110, and thereafter, the conductive paste is baked. The conductive paste includes an organic solvent, metal particles and glass. In the present preferred embodiment, the baking temperature is preferably about 840° C., for example.

Next, first Ni plated layer 122, second Ni plated layer 123 and upper plated layer 124 are sequentially formed by electrolytic plating, for example, to cover base electrode layer 121 by the plating treatment. Each of the electrodes is formed, and thus, first external electrode 120A and second external electrode 120B are formed.

In the present preferred embodiment, first Ni plated layer 122 and second Ni plated layer 123 are formed by electrolytic plating using a barrel electroplating device, for example. The average particle size of each of first Ni particles 122G in first Ni plated layer 122 and second Ni particles 123G in second Ni plated layer 123 can be set as appropriate by controlling processing conditions, such as the metal ion concentration in a plating solution used in the electrolytic plating, the type and concentration of an additive contained in the plating solution, the current value of a current applied during the electrolytic plating, the treatment temperature, or the strength of agitation of the plating solution. For example, the average particle size of the Ni particles decreases as the concentration of the additive in the plating solution increases. The average particle size of the Ni particles decreases as the current value of the applied current increases. The average particle size of the Ni particles decreases as the temperature of the plating solution increases.

Table 1 below shows example processing conditions for electrolytic plating using a barrel electroplating device, when an average particle size of Ni plating is set by controlling the processing conditions. Saccharin was used as an additive in Table 1 below.

TABLE 1

|  | Processing Condition 1 | Processing Condition 2 | Processing Condition 3 |
| --- | --- | --- | --- |
| Concentration of Additive [g/L] | 1 | 1 | 1 |
| Temperature of Plating Solution [° C.] | 60 | 60 | 60 |
| Current Value [A] | 15 | 10 | 5 |
| Diameter of Barrel [mm] | 67 | 67 | 67 |
| Amount of Conductive Medium [cc] | 60 | 60 | 60 |
| Particle Size of Ni Particles [nm] | 37 | 52 | 78 |

As shown in Table 1, an applied current has different current values among a processing condition 1, a processing condition 2, and a processing condition 3. As shown in Table 1, it can be seen that the particle size of Ni particles in the Ni plating decreases as the current value increases.

In addition to the saccharin, benzenesulfonic acid, benzothiazole, thiourea, benzalacetone, polyethylene glycol, butynediol, propargyl alcohol or the like, for example, can be used as the additive.

When the first Ni plated layer and the second Ni plated layer are formed by electrolytic plating, hydrogen atoms are generated due to a reduction reaction of hydrogen ions. The hydrogen atoms are occluded in each of first Ni plated layer 122 and the second Ni plated layer. The occluded hydrogen atoms are able to freely move through external electrode 120.

Through the series of steps described above, electronic component 100 according to the first preferred embodiment of the present invention which is a multilayer ceramic capacitor is manufactured.

A first experimental example will be described below, in which variations in insulation resistance and solder wettability after an accelerated test in electronic component 100 was evaluated, while each of an average particle size $D_{N1}$ of Ni particles 122G in first Ni plated layer 122, an average particle size $D_{N2}$ of Ni particles 123G in second Ni plated layer 123, a thickness $T_{N1}$ of first Ni plated layer 122, and a thickness $T_{N2}$ of second Ni plated layer 123 was varied in the electronic component.

In this experimental example, the electronic component according to each example and each comparative example was manufactured such that the electronic component had a dimension of about 1.10 mm in length direction L, a dimension of about 0.600 mm in width direction W, and a dimension of about 0.600 mm in stacking direction T. The electronic component according to each example and each comparative example was also manufactured such that each of the plurality of dielectric layers 130 included in inner layer portion C had a thickness of about 0.60 µm, each of the plurality of internal electrode layers 140 included in inner layer portion C had a thickness of about 0.50 µm, each of first end margin portion E1 and second end margin portion E2 had a dimension of about 40 µm in length direction L, each of first side margin portion S1 and second side margin portion S2 had a dimension of about 20 µm in width direction W, and each of first outer layer portion X1 and second outer layer portion X2 had a dimension of about 30 µm in stacking direction T.

In this experimental example, "SMI-3050R" manufactured by SII NanoTechnology Inc. was used as an FIB device used for the measurement of the average particle size of the Ni particles.

The accelerated test was conducted by applying a voltage to the electronic component in a bath having high temperature and high humidity. First, the electronic component according to each example and each comparative example was placed in a bath having an atmosphere of about 125° C. and a relative humidity of about 95% RH. Then, the electronic component placed in the bath was held for about 100 hours while a DC voltage of about 1 V was applied between first external electrode 120A and second external electrode 120B. The electronic component thus treated was measured for its insulation resistance value, and was determined to have "failed" if the insulation resistance value was about 90% or less than the insulation resistance value in a state before the accelerated test.

The evaluation of solder wettability was performed with a solder globule balancing method using a solder checker (model number: SAT-5100) manufactured by Rhesca Co., Ltd. Aging was performed for about four hours using an unsaturated PCT device under an atmosphere of a temperature of about 105° C., a relative humidity of not more than about 100% RH, and an atmospheric pressure of about $1.22 \times 10^5$ Pa. The solder had a composition of Sn-3.0Ag-0.5Cu, the solder had a mass of about 25±2.5 mg, an iron core had a diameter of about 2 mm, flux contained about 25 wt % of rosin and 2-propanol (isopropyl alcohol), the amount of flux on a solder side was about 20±1 µL, the dipping speed was about 1 mm/s, the dipping depth was about 0.1 mm, the dipping time was about 10 seconds, the measurement range was about 5 mN, and the test temperature was about 230±3° C. Under the conditions described above, a time $T_0$ between when the electronic component made contact with the solder and when the angle of contact with the solder returned to about 90 degrees was measured. As a result of the measurement, the electronic component was determined to be "passed" if its time $T_0$ was not longer than about 4.0 seconds, and determined to have "failed" if its time $T_0$ was longer than about 4.0 seconds.

Tables 2 to 4 below show results of the evaluation of insulation resistance and solder wettability after the accelerated test in the electronic component according to each example and each comparative example. In the evaluation results of insulation resistance after the accelerated test in Tables 2 to 4, "A" indicates that zero electronic components were determined to have "failed," "B" indicates that not less than one and not more than three electronic components were determined to have "failed," and "C" indicates that not less than four electronic components were determined to have "failed," as a result of measurement of insulation resistance values of ten samples for each example and each comparative example. In the evaluation results of solder wettability in Tables 2 to 4, "A" indicates that zero electronic components were determined to have "failed," "B" indicates that not less than one and not more than three electronic components were determined to have "failed," and "C" indicates that not less than four electronic components were determined to have "failed," as a result of measurement of time $T_0$ of ten samples for each example and each comparative example.

TABLE 2

|  | Ex. 1 | Ex. 2 | Ex. 3 | Ex. 4 | Ex. 5 | Com. Ex. 1 | Com. Ex. 2 | Com. Ex. 3 | Com. Ex. 4 | Com. Ex. 5 | Ex. 6 | Ex. 7 | Ex. 8 | Ex. 9 | Com. Ex. 6 | Com. Ex. 7 | Com. Ex. 8 |
|---|---|---|---|---|---|---|---|---|---|---|---|---|---|---|---|---|---|
| Average Particle Size $D_{N1}$ [nm] of Ni Particles in First Ni Plated Layer | 15 | 22 | 35 | 44 | 52 | 82 | 105 | 108 | 111 | 77 | 21 | 21 | 46 | 39 | 98 | 65 | 76 |
| Average Particle Size $D_{N2}$ [nm] of Ni Particles in Second Ni Plated Layer | 102 | 201 | 158 | 99 | 323 | 194 | 104 | 85 | 61 | 48 | 32 | 357 | 218 | 43 | 301 | 188 | 304 |
| $D_{N2}/D_{N1}$ | 6.8 | 9.1 | 4.5 | 2.3 | 6.2 | 2.4 | 1.0 | 0.8 | 0.5 | 0.6 | 1.5 | 17 | 4.7 | 1.1 | 3.1 | 2.9 | 4.0 |
| Insulation Resistance After Accelerated Test | A | A | A | A | A | B | C | C | C | B | A | A | A | A | C | B | B |
| Solder Wettability | A | A | A | A | A | A | A | B | C | C | C | A | A | C | A | A | A |

TABLE 3

|  | Ex. 10 | Ex. 11 | Ex. 12 | Ex. 13 | Ex. 14 | Ex. 15 | Ex. 16 | Ex. 17 | Ex. 18 | Com. Ex. 9 |
|---|---|---|---|---|---|---|---|---|---|---|
| Average Particle Size $D_{N1}$ [nm] of Ni Particles in First Ni Plated Layer | 35 | 35 | 35 | 35 | 35 | 35 | 35 | 35 | 35 | — |
| Average Particle Size $D_{N2}$ [nm] of Ni Particles in Second Ni Plated Layer | — | 250 | 250 | 250 | 250 | 250 | 250 | 250 | 250 | 250 |
| Thickness $T_{N1}$ [μm] of First Ni Plated Layer | 3.1 | 2.6 | 2.2 | 1.8 | 1.5 | 1.2 | 0.9 | 0.6 | 0.1 | 0 |
| Thickness $T_{N2}$ [μm] of Second Ni Plated Layer | 0 | 0.3 | 0.9 | 1.2 | 1.4 | 1.6 | 2.1 | 2.5 | 2.9 | 2.9 |
| $T_{N1}/(T_{N1} + T_{N2})$ [%] | 100.0 | 89.7 | 71.0 | 60.0 | 51.7 | 42.9 | 30.0 | 19.4 | 3.3 | 0.0 |
| $T_{N1}/T_{N2}$ | — | 8.67 | 2.44 | 1.50 | 0.11 | 0.75 | 0.43 | 0.24 | 0.03 | 0.00 |
| Insulation Resistance After Accelerated Test | A | A | A | A | A | A | A | A | A | C |
| Solder Wettability | C | A | A | A | A | A | A | A | A | A |

TABLE 4

|  | Ex. 19 | Ex. 20 | Ex. 21 | Ex. 22 | Ex. 23 | Ex. 24 | Ex. 25 | Ex. 26 | Com. Ex. 10 |
|---|---|---|---|---|---|---|---|---|---|
| Average Particle Size $D_{N1}$ [nm] of Ni Particles in First Ni Plated Layer | 35 | 35 | 35 | 35 | 35 | 35 | 35 | 35 | — |

TABLE 4-continued

| | Ex. 19 | Ex. 20 | Ex. 21 | Ex. 22 | Ex. 23 | Ex. 24 | Ex. 25 | Ex. 26 | Com. Ex. 10 |
|---|---|---|---|---|---|---|---|---|---|
| Average Particle Size $D_{N2}$ [nm] of Ni Particles in Second Ni Plated Layer | — | 120 | 120 | 120 | 120 | 120 | 120 | 120 | 120 |
| Thickness $T_{N1}$ [μm] of First Ni Plated Layer | 3.1 | 2.9 | 2.5 | 1.8 | 1.2 | 0.7 | 0.6 | 0.1 | 0 |
| Thickness $T_{N2}$ [μm] of Second Ni Plated Layer | 0 | 0.2 | 0.7 | 1.1 | 1.7 | 2.3 | 2.5 | 3.0 | 3.1 |
| $T_{N1}/(T_{N1} + T_{N2})$ [%] | 100.0 | 93.5 | 78.1 | 62.1 | 41.4 | 23.3 | 19.4 | 3.2 | 0.0 |
| $T_{N1}/T_{N2}$ | — | 14.5 | 1.63 | 1.50 | 0.71 | 0.30 | 0.24 | 0.03 | 0 |
| Insulation Resistance After Accelerated Test | A | A | A | A | A | A | A | A | C |
| Solder Wettability | C | A | A | A | A | A | A | A | A |

As shown in Tables 2 to 4, the evaluation of insulation resistance after the accelerated test is "B" or "C" in Comparative Examples 1 to 8 where average particle size $D_{N1}$ of the Ni particles in the first Ni plated layer exceeds about 52 nm, and in Comparative Examples 9 and 10 that do not include the first Ni plated layer. That is, the insulation resistance tends to decrease in the electronic component according to each comparative example.

The reason for the decrease in insulation resistance may be as set forth below. As described above, hydrogen atoms are generated when the first Ni plated layer and the second Ni plated layer are formed by electrolytic plating. In the electronic component according to each comparative example described above, the hydrogen atoms are able to freely move through the external electrode having a metal component, and the hydrogen atoms also diffuse into the body portion. The hydrogen atoms that have diffused into the body portion cause a decrease in insulation resistance of the body portion.

As shown in Tables 2 to 4, however, the evaluation of insulation resistance after the accelerated test is "A" in Examples 1 to 26, where average particle size $D_{N1}$ of the Ni particles in the first Ni plated layer is not more than about 52 nm. That is, the decrease in insulation resistance is reduced or prevented in the electronic component according to each example.

Figure 6:
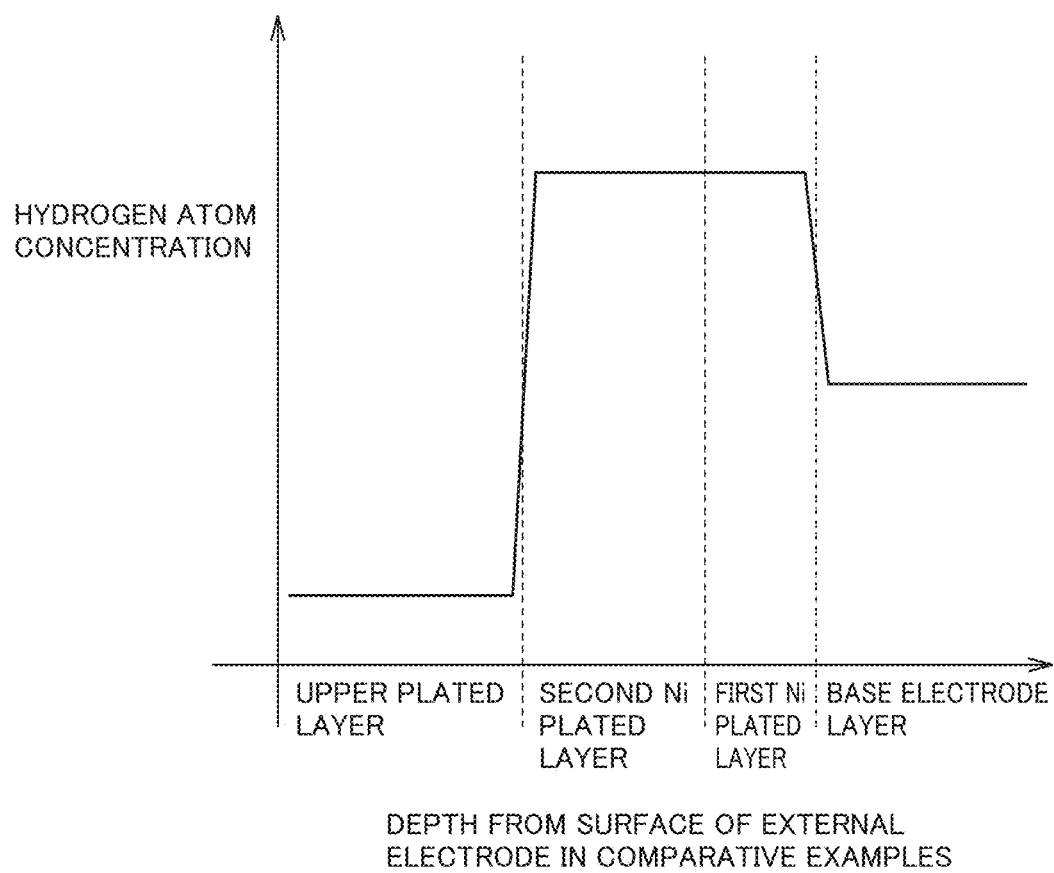
FIG. 6 is a graph schematically showing an example result of measurement of variations in hydrogen atom concentration in an external electrode with respect to the depth from a surface of the external electrode, in electronic components according to comparative examples in a first experimental example of the present invention.
Figure 7:
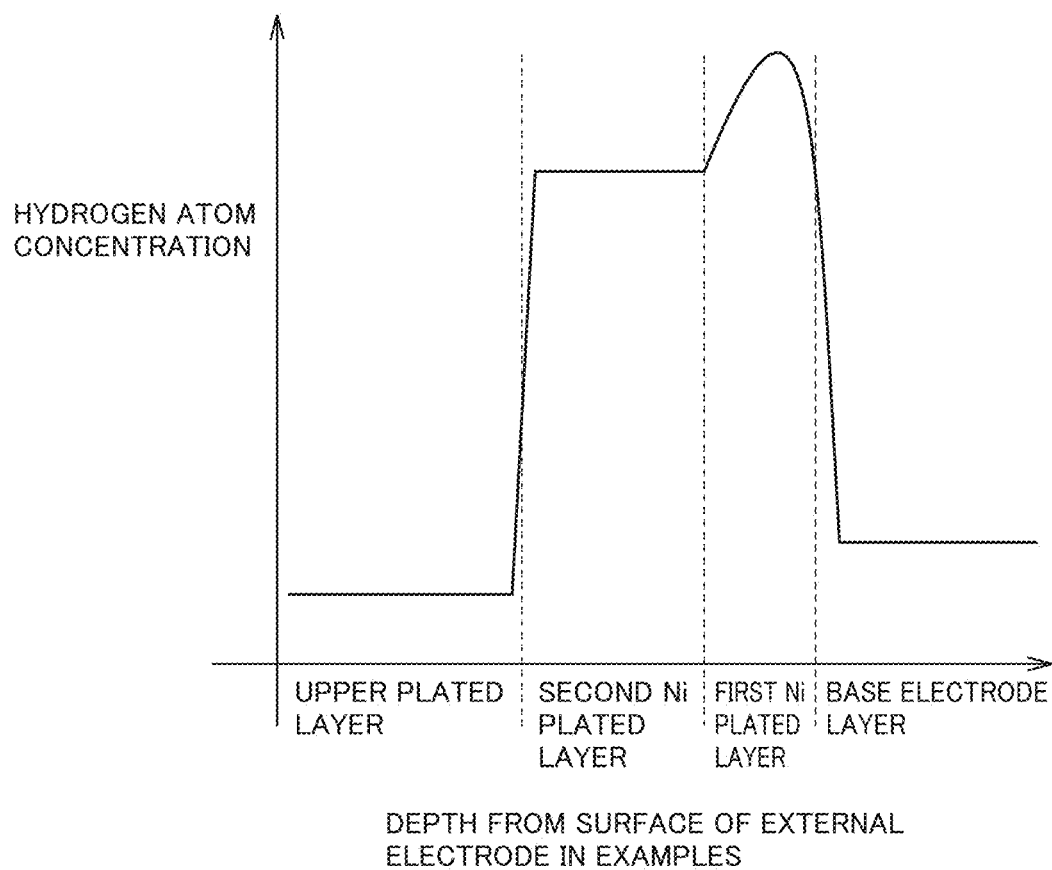
FIG. 7 is a graph schematically showing an example result of measurement of variations in hydrogen atom concentration in an external electrode with respect to the depth from a surface of the external electrode, in electronic components according to examples of preferred embodiments of the present invention in the first experimental example of the present invention.

The reason for the reduction or prevention of the decrease in insulation resistance may be as set forth below. FIG. 6 is a graph schematically showing an example result of measurement of variations in hydrogen atom concentration in the external electrode with respect to the depth from the surface of the external electrode, in the electronic components according to the comparative examples in the first experimental example of the present invention. FIG. 7 is a graph schematically showing an example result of measurement of variations in hydrogen atom concentration in the external electrode with respect to the depth from the surface of the external electrode, in the electronic components according to the examples in the first experimental example of the present invention.

FIGS. 6 and 7 show results of measurement in electronic components including both the first Ni plated layer and the second Ni plated layer. The hydrogen atom concentration can be measured with dynamic-secondary ion mass spectrometry (D-SIMS), for example. In this experimental example, the hydrogen atom concentration was measured with D-SIMS using "IMS-6f" manufactured by Cameca.

As shown in FIG. 6, in the electronic components according to the comparative examples, the hydrogen atom concentration in the first Ni plated layer and the hydrogen atom concentration in the second Ni plated layer are equal or substantially equal to each other in the external electrode. In contrast, as shown in FIG. 7, in the electronic component according to each example, the hydrogen atom concentration in the first Ni plated layer is the highest in the external electrode. Moreover, as shown in FIGS. 6 and 7, the hydrogen atom concentration in the base electrode layer of the electronic components according to the examples is lower than the hydrogen atom concentration in the base electrode layer of the electronic components according to the comparative examples.

As shown in FIGS. 6 and 7, therefore, in the electronic component according to each example in this experimental example, first Ni plated layer 122 traps the hydrogen atoms, which leads to a relatively smaller number of hydrogen atoms diffusing into base electrode layer 121, which in turn is believed to lead to a relatively smaller number of hydrogen atoms diffusing into body portion 110 through base electrode layer 121. A smaller number of hydrogen atoms in body portion 110 leads to a smaller number of hydrogen atoms diffusing in dielectric layer 130. It is believed that the decrease in insulation resistance is reduced or prevented in this manner in electronic component 100 according to each example described above.

As shown in Tables 2 to 4, in each example, the first Ni plated layer includes Ni particles having an average particle size of not more than about 52 nm, and thus includes Ni particles having a relatively small particle size. That is, the first Ni plated layer in each example has a large grain boundary area of Ni particles. It is believed that the hydrogen atoms diffusing in external electrode 120 tend to accumulate on an interface between the Ni particles in the first Ni plated layer in each example.

Results of the evaluation of solder wettability will now be described. As shown in Table 2, the evaluation of solder wettability is "A" in the electronic components according to Examples 1 to 5, 7, and 8 where average particle size $D_{N2}$ of the Ni particles in the second Ni plated layer is not less than about 2.3 times average particle size $D_{N1}$ of the Ni particles in the first Ni plated layer. On the other hand, the evaluation of solder wettability is "C" in the electronic components according to Examples 6 and 9 where average particle size $D_{N2}$ of the Ni particles in the second Ni plated layer is less than about 2.3 times average particle size $D_{N1}$ of the Ni particles in the first Ni plated layer. That is, it can be seen that the solder wettability is improved when average particle size $D_{N2}$ of the Ni particles in the second Ni plated layer is not less than about 2.3 times average particle size $D_{N1}$ of the Ni particles in the first Ni plated layer.

The reason for the improvement in solder wettability may be as set forth below. When solder adheres to external electrode 120, the solder melts upper plated layer 124, and then wets and spreads over second Ni plated layer 123. In the electronic components according to Examples 1 to 5, 7, and 8, Ni particles 123G of second Ni plated layer 123 have a relatively large average particle size due to the configuration described above, and therefore, oxidation of Ni is reduced or prevented in second Ni plated layer 123. It is believed that the wettability is improved on the surface of second Ni plated layer 123 where the oxidation is reduced or prevented. This, in turn, is believed to improve the solder wettability when solder adheres to external electrode 120.

As shown in Tables 3 and 4, the decrease in insulation resistance is reduced or prevented in the electronic components according to Examples 11 to 18 and 20 to 26 where thickness $T_{N1}$ of the first Ni plated layer is not less than about 0.03 times thickness $T_{N2}$ of the second Ni plated layer. The solder wettability is improved in the electronic components according to Examples 10 to 26 where thickness $T_{N1}$ of the first Ni plated layer is not more than about 14.5 times thickness $T_{N2}$ of the second Ni plated layer.

As shown in Table 2, the solder wettability is improved in the electronic components according to Examples 1 to 5, 7, and 8 where average particle size $D_{N2}$ of the Ni particles in the second Ni plated layer is not less than about 99 nm, as compared to the electronic components according to Examples 6 and 9 where average particle size $D_{N2}$ of the Ni particles in the second Ni plated layer is less than about 99 nm.

As described above, in electronic component 100 according to the first preferred embodiment of the present invention, first Ni plated layer 122 includes Ni particles having an average particle size of not more than about 52 nm.

Therefore, the diffusion of hydrogen atoms from first Ni plated layer 122 into body portion 110 can be reduced or prevented. This, in turn, can reduce or prevent the degradation of electrical characteristics of electronic component 100.

In the present preferred embodiment, the average particle size of Ni particles 123G of second Ni plated layer 123 is not less than about 2.3 times the average particle size of the Ni particles making up first Ni plated layer 122.

Therefore, the oxidation is reduced or prevented on the surface of second Ni plated layer 123, and the solder wettability is thus improved. This, in turn, can improve the solder wettability of external electrode 120.

In the present preferred embodiment, first Ni plated layer 122 has a thickness that is not less than about 0.3 times the thickness of second Ni plated layer 123.

Therefore, first Ni plated layer 122 capable of trapping the hydrogen atoms is provided to have a prescribed thickness, and is thus able to trap more hydrogen atoms. This, in turn, can reduce or prevent the degradation of electrical characteristics of electronic component 100.

In the present preferred embodiment, first Ni plated layer 122 has a thickness that is not more than about 14.5 times the thickness of second Ni plated layer 123.

Therefore, a prescribed thickness of second Ni plated layer 123 can be ensured, and exposure of first Ni plated layer 122 together with second Ni plated layer 123 can thus be reduced or prevented when upper plated layer 124 is melted due to the adhesion of solder. Thus, the decrease in solder wettability of external electrode 120 can be reduced or prevented.

In the present preferred embodiment, second Ni plated layer 123 includes Ni particles having an average particle size of not less than about 99 nm.

Therefore, the oxidation of Ni particles 123G on the surface of second Ni plated layer 123 is reduced or prevented, leading to improved solder wettability of second Ni plated layer 123. The solder wettability of external electrode 120 can thus be improved.

In the present preferred embodiment, base electrode layer 121 includes metal. Therefore, a prescribed electrical conductivity can be ensured in base electrode layer 121.

In the present preferred embodiment, base electrode layer 121 may further include a metal oxide. Therefore, when body portion 110 and base electrode layer 121 are formed by simultaneous firing, securing power between base electrode layer 121 and body portion 110 can be improved. This, in turn, can reduce the thickness of the entire external electrode 120.

In the present preferred embodiment, base electrode layer 121 further includes glass. Therefore, when applying a conductive paste to body portion 110 to provide base electrode layer 121, the glass enables securing of a sintering aid included in the conductive paste and body portion 110 to each other at sufficient strength.

In the present preferred embodiment, base electrode layer 121 may further include a resin component. Therefore, when electronic component 100 is mounted on a substrate, base electrode layer 121 can have improved strength with respect to deflection of the substrate.

In the present preferred embodiment, the metal included in base electrode layer 121 includes, for example, Cu (copper), Ag (silver), Au (gold), Ni (nickel), Sn (tin), or an alloy having any of them.

Therefore, base electrode layer 121 can have a relatively high electrical conductivity.

Electronic component 100 according to the present preferred embodiment is a multilayer ceramic capacitor, for example.

In electronic component 100 in the present preferred embodiment, the diffusion of hydrogen atoms into base electrode layer 121 is reduced or prevented. Thus, reduction of the ceramics included in body portion 110 of the multilayer ceramic capacitor with the hydrogen atoms can be reduced or prevented. This, in turn, can reduce or prevent the decrease in insulation resistance of the multilayer ceramic capacitor due to the reduction of the ceramics with the hydrogen atoms.

Second Preferred Embodiment

An electronic component according to a second preferred embodiment of the present invention will be described below. The electronic component according to the second preferred embodiment of the present invention is different from electronic component 100 according to the first preferred embodiment of the present invention in that the external electrode does not include the second Ni plated layer. Thus, description of a configuration the same as or similar to that of the electronic component according to the first preferred embodiment of the present invention will not be repeated.

Figure 8:
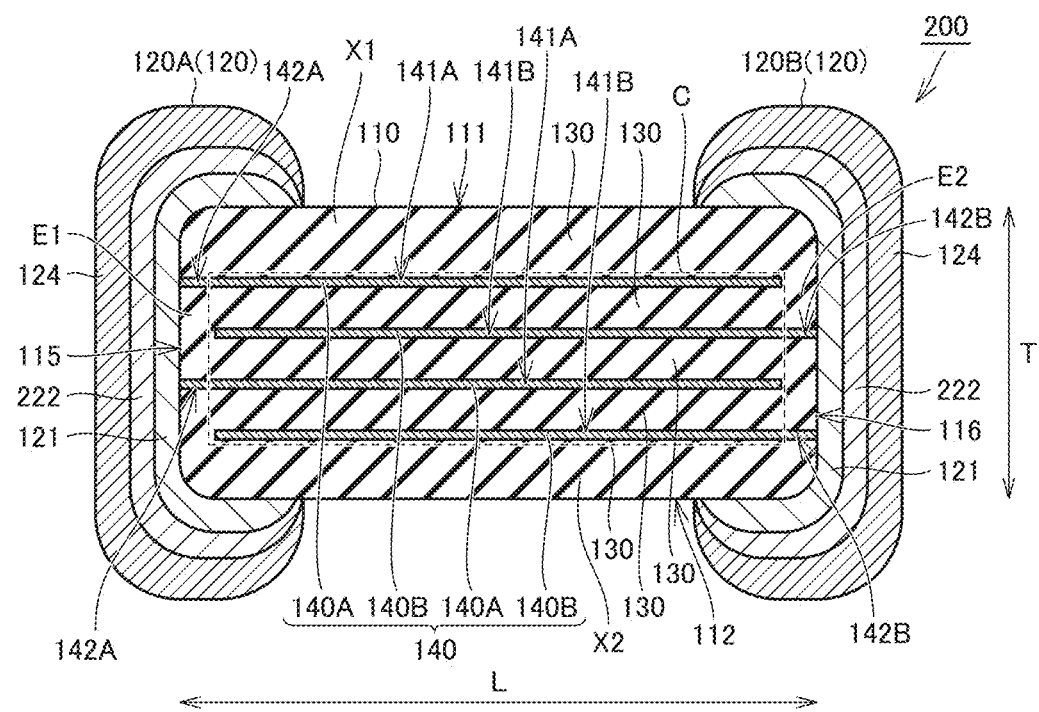
FIG. 8 is a cross-sectional view illustrating an electronic component according a second preferred embodiment of the present invention.

FIG. 8 is a cross-sectional view illustrating the electronic component according to the second preferred embodiment of the present invention. FIG. 8 is illustrated in the same cross section as FIG. 2. As shown in FIG. 8, in an electronic component 200 according to the second preferred embodiment of the present invention, upper plated layer 124 is provided on a first Ni plated layer 222.

A second experimental example will now be described, in which insulation resistance after an accelerated test in electronic component 200 according to the present preferred embodiment was evaluated. Each measurement condition and a method of evaluating insulation resistance in the second experimental example are the same as or similar to those of the first experimental example in the first preferred embodiment of the present invention.

Tables 5 below shows results of the evaluation of insulation resistance after the accelerated test in the electronic component according to each example and each comparative example in the second experimental example.

TABLE 5

|  | Ex. 27 | Ex. 28 | Ex. 29 | Ex. 30 | Ex. 31 | Ex. 32 | Com. Ex. 11 | Com. Ex. 12 | Com. Ex. 13 | Com. Ex. 14 | Com. Ex. 15 |
|---|---|---|---|---|---|---|---|---|---|---|---|
| Average Particle Size $D_{N1}$ [nm] of Ni Particles in First Ni Plated Layer | 15 | 21 | 22 | 35 | 44 | 52 | 82 | 105 | 108 | 111 | 77 |
| Insulation Resistance After Accelerated Test | A | A | A | A | A | A | B | C | C | C | B |

As shown in Table 5, the evaluation of insulation resistance after the accelerated test is "B" or "C" in Comparative Examples 11 to 15 where average particle size $D_{N1}$ of the Ni particles in the first Ni plated layer exceeds about 52 nm. On the other hand, the evaluation of insulation resistance after the accelerated test is "A" in Examples 27 to 32 where average particle size $D_{N1}$ of the Ni particles in the first Ni plated layer is not more than about 52 nm. That is, also in the second experimental example, the decrease in insulation resistance is reduced or prevented in the electronic component according to each example.

From the above, also in the second preferred embodiment of the present invention, since first Ni plated layer 222 includes Ni particles 122G having an average particle size of not more than about 52 nm, the diffusion of hydrogen atoms from first Ni plated layer 222 into body portion 110 can be reduced or prevented. This, in turn, can reduce or prevent the degradation of characteristics of electronic component 100.

In the above description of the preferred embodiments, combinable components may be combined together.

Although preferred embodiments of the present invention have been described and illustrated in detail, it is understood that the same is by way of illustration and example only and is not to be taken by way of limitation, the scope of the present invention being interpreted by the terms of the appended claims.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electronic component comprising:
   a body portion; and
   an external electrode provided on a surface of the body portion; wherein
   the external electrode including a base electrode layer, a first Ni plated layer provided on the base electrode layer, and an upper plated layer provided above the first Ni plated layer; and
   the first Ni plated layer includes Ni particles having an average particle size of not more than about 52 nm.

2. The electronic component according to claim 1, wherein
   the external electrode further includes a second Ni plated layer between the first Ni plated layer and the upper plated layer; and
   an average particle size of Ni particles included in the second Ni plated layer is not less than about 2.3 times the average particle size of the Ni particles included in the first Ni plated layer.

3. The electronic component according to claim 2, wherein the first Ni plated layer has a thickness not less than about 0.03 times a thickness of the second Ni plated layer.

4. The electronic component according to claim 3, wherein the first Ni plated layer has a thickness not more than about 14.5 times the thickness of the second Ni plated layer.

5. The electronic component according to claim 1, wherein
   the external electrode further includes a second Ni plated layer between the first Ni plated layer and the upper plated layer; and
   the second Ni plated layer includes Ni particles having an average particle size of not less than about 99 nm.

6. The electronic component according to claim 5, wherein the first Ni plated layer has a thickness not less than about 0.03 times a thickness of the second Ni plated layer.

7. The electronic component according to claim 6, wherein the first Ni plated layer has a thickness not more than about 14.5 times the thickness of the second Ni plated layer.

8. The electronic component according to claim 1, wherein the base electrode layer includes metal.

9. The electronic component according to claim 8, wherein the base electrode layer further includes a metal oxide.

10. The electronic component according to claim 8, wherein the base electrode layer further includes glass.

11. The electronic component according to claim 10, wherein
    the base electrode layer further includes a metal oxide.

12. The electronic component according to claim 8, wherein the base electrode layer further includes a resin component.

13. The electronic component according to claim 12, wherein the base electrode layer further includes a metal oxide.

14. The electronic component according to claim 8, wherein the base electrode layer further includes glass and a resin component.

15. The electronic component according to claim 14, wherein the base electrode layer further includes a metal oxide.

16. The electronic component according to claim 8, wherein the metal includes Cu, Ag, Au, Ni, Sn, or an alloy including any of Cu, Ag, Au, Ni, and Sn.

17. The electronic component according to claim 1, wherein the electronic component is a multilayer ceramic capacitor.

18. The electronic component according to claim 1, wherein the body portion is a stacked body including a plurality of dielectric layers and a plurality of internal electrode layers that are alternately stacked on one another.

19. The electronic component according to claim 18, wherein the plurality of internal electrode layers are connected to the external electrode.

20. The electronic component according to claim 18, wherein each of the plurality of dielectric layers has a thickness of not less than about 0.4 μm and not more than about 0.6 μm.

\* \* \* \* \*